(12) United States Patent
Zhang

(10) Patent No.: US 8,749,730 B2
(45) Date of Patent: Jun. 10, 2014

(54) EDGE-LIT BACKLIGHT MODULE AND LCD DEVICE

(75) Inventor: Yanxue Zhang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 171 days.

(21) Appl. No.: 13/496,943

(22) PCT Filed: Feb. 28, 2012

(86) PCT No.: PCT/CN2012/071701
§ 371 (c)(1),
(2), (4) Date: Mar. 19, 2012

(87) PCT Pub. No.: WO2013/120284
PCT Pub. Date: Aug. 22, 2013

(65) Prior Publication Data
US 2013/0215363 A1    Aug. 22, 2013

(30) Foreign Application Priority Data

Feb. 16, 2012  (CN) .......................... 2012 1 0035176

(51) Int. Cl.
*G02F 1/1335*    (2006.01)
*F21V 7/04*      (2006.01)

(52) U.S. Cl.
USPC ................ 349/65; 349/61; 349/62; 362/611; 362/615; 362/634

(58) Field of Classification Search
USPC ................ 349/65, 61, 62; 362/611, 615, 634
See application file for complete search history.

(56) References Cited

U.S. PATENT DOCUMENTS

| 2010/0110727 | A1  | 5/2010  | Iwasaki |
| 2012/0327686 | A1* | 12/2012 | Chen et al. .................... 362/611 |
| 2013/0135559 | A1* | 5/2013  | Deng et al. ..................... 349/65 |

FOREIGN PATENT DOCUMENTS

| CN | 202002027 U | 10/2011 |
| CN | 202067045 U | 12/2011 |

(Continued)

OTHER PUBLICATIONS

Mo Fan, the first office action, Mar. 2013, CN.

(Continued)

*Primary Examiner* — Mike Qi
(74) *Attorney, Agent, or Firm* — IPro, Inc.; Na Xu

(57) ABSTRACT

The invention relates to the field of liquid crystal displays, and more particularly to an edge-lit backlight module and an LCD device. The edge-lit backlight module includes a light guide panel and a positioning part for positioning the light guide panel. The light guide panel is rigidly positioned in the direction facing a light source and buffer positioned in all the other directions. A new positioning structure for light guide panels is used by the edge-lit backlight module and the LCD device of the invention. The light coupling distance between the light guide panel and the light source of the edge-lit backlight module is controlled because the light guide panel is rigidly positioned in the direction facing the light source, so as to obtain preferable light guiding effect. The light guide panel is buffer positioned in other directions in order to absorb the heat expansion or cold contraction quantity of the light guide panel, and avoid the warpage and deformation of the light guide panel; and the fracture of the light guide panel caused by the rigid contact between the light guide panel and the positioning structure when the light guide panel is impacted is avoided.

22 Claims, 2 Drawing Sheets

(56) References Cited

FOREIGN PATENT DOCUMENTS

| | | | | |
|---|---|---|---|---|
| CN | 102322600 A | 1/2012 | | |
| CN | 102345818 A | 2/2012 | | |
| CN | 102352985 A | * | 2/2012 | ............ F21Y 101/02 |
| CN | 102352991 A | 2/2012 | | |
| CN | 202132886 U | 2/2012 | | |
| JP | 2007-192921 A | 8/2007 | | |
| JP | 2012-15000 A | 1/2012 | | |

OTHER PUBLICATIONS

Yang Xi, the International Searching Authority written comments, Nov. 2012, CN.

* cited by examiner

EDGE-LIT BACKLIGHT MODULE AND LCD DEVICE

TECHNICAL FIELD

The invention relates to the field of liquid crystal displays (LCDs), and more particularly to an edge-lit backlight module and an LCD device.

BACKGROUND

Conventional edge-lit backlight modules in mass production employ a light guide panel. Because the light coupling distance between the light source of a backlight module and the light guide panel is required to be accurate, the light guide panel tends to be positioned by rigid positioning column(s) or right-angle positioning rim(s). However, the light source of the backlight module radiates heat while in use, which heats and expands the light guide panel. Because the positioning column or the right-angle positioning rim is made of rigid material and has no buffer action, generally come the following problems: the heat expansion or cold contraction quantity of the light guide panel cannot be fully absorbed, easily causing the warpage and deformation of the light guide panel; and the light guide panel is in rigid contact with the positioning structure, easily causing the light guide panel to fracture when being impacted.

SUMMARY

The aim of the invention is to provide an edge-lit backlight module and an LCD device, which use a positioning structure for a light guide panel capable of accurately ensuring the light coupling distance between the light source of the backlight module and the light guide panel, and fully absorbing the heat expansion or cold contraction quantity of the light guide panel.

The purpose of the invention is achieved by the following technical schemes.

An edge-lit backlight module comprises a light guide panel and a positioning part for positioning the light guide panel; the light guide panel is rigidly positioned in the direction facing a light source, and is buffer positioned in all the other directions.

Preferably, one corner of the light guide panel near the light source is rigidly positioned in an X direction and rigidly positioned or buffer positioned in a Y direction, and the rest corners are buffer positioned in both the X and Y direction; wherein, within a plane of the light guide panel, a direction perpendicular to the light incident surface of the light guide panel is the X direction, and a direction parallel to the light incident surface is the Y direction.

Preferably, the rigidly positioned corner of the light guide panel is provided with a nick, the position of the positioning part corresponding to the nick is provided with a positioning column, and the corner is rigidly positioned by the positioning column in both the X and Y direction. The technical scheme of using the positioning column and setting the nick in the light guide panel is employed because the space near the light source is limited, and small space is occupied in the technical scheme, so that the volume of the backlight module can be reduced as far as possible.

Preferably, the light guide panel is buffer positioned by a buffer part in all the other directions; the buffer part comprises two right-angle sides, and the two right-angle sides are respectively attached to two outer side surfaces of the corresponding corner of the light guide panel. The phenomenon that the optical quality is reduced because the nick is arranged in the light guide panel is avoided as surface contact positioning is used without processing the light guide panel.

Preferably, the light guide panel is buffer positioned by a positioning column in all the other directions, and the positioning column for buffer positioning is sheathed with an elastic rubber ring. The elastic rubber ring can provide certain buffer space by self elasticity.

Preferably, the light guide panel is partially buffer positioned by a buffer part in other directions; the buffer part comprises two right-angle sides, and the two right-angle sides are respectively attached to two outer side surfaces of the corresponding corner of the light guide panel, to be partially buffer positioned by the positioning column, and the positioning column for buffer positioning is sheathed with an elastic rubber ring.

Preferably, the side surface of the elastic rubber ring is tooth-shaped. The elastic rubber ring with a tooth-shaped side surface has a bigger buffer space, and can fully absorb the heat expansion or cold contraction quantity of the light guide panel.

Preferably, the inner side surface of the right-angle sides of the buffer part is tooth-shaped The tooth-shaped buffer surface can reduce the contact area between the two right-angle sides and the light guide panel under the condition that the positioning length is not reduced, thereby obtaining buffer effect.

Preferably, the buffer part is provided with a groove on the back of the side right-angle surface butting with the light guide panel in the direction away from the light guide panel, and the direction of the groove is in parallel with the side of the light guide panel. The groove provides a greater buffer allowance, and performs further deformation to increase buffer effect when the tooth-shaped buffer surface cannot sufficiently buffer and adjust as the heat expansion quantity or the tolerance of the light guide panel becomes larger.

Preferably, the buffer part and the positioning part are integratedly formed.

Preferably, the buffer part and the positioning part are separately formed; the positioning part is provided with a positioning column, the buffer part is provided with a positioning hole in the position corresponding to the positioning column, and the positioning column is sheathed in the positioning hole to fix the buffer part.

Preferably, the buffer part is provided with a light guide panel bearing surface, and the light guide panel bearing surface is mutually perpendicular to the two right-angle sides of the buffer part. The light guide panel bearing surface can prevent the light guide panel from sinking when protecting the light guide panel.

Preferably, the positioning part is a backplane or back frame.

Preferably, the light incident surface of the light guide panel is assembled with the light source with zero clearance. The smaller the clearance between the light incident surface of the light guide panel and the light source, the better the light coupling effect. The light coupling effect is the best when the clearance is zero, and the heat expansion quantity can be fully absorbed in other directions.

The invention further provides an LCD device, comprising: an edge-lit backlight module; wherein the edge-lit backlight module comprises a light guide panel and a positioning part for positioning the light guide panel; the light guide panel is rigidly positioned in the direction facing a light source and buffer positioned in all the other directions.

Preferably, one corner of the light guide panel near the light source is rigidly positioned in the X direction and rigidly positioned or buffer positioned in the Y direction, and the rest corners are buffer positioned in both the X and Y direction; wherein, within the plane of the light guide panel, the direction perpendicular to the light incident surface of the light guide panel is the X direction, and the direction parallel to the light incident surface is the Y direction.

Preferably, the rigidly positioned corner of the light guide panel is provided with a nick, the position of the positioning part corresponding to the nick is provided with a positioning column, and the corner is rigidly positioned by the positioning column in both the X and Y direction.

Preferably, the light guide panel is positioned by a buffer part in all the other directions; the buffer part comprises two right-angle sides, and the two right-angle sides are respectively attached to two outer side surfaces of the corresponding corner of the light guide panel.

Preferably, the light guide panel is partially buffer positioned by a buffer part in the other directions; the buffer part comprises two right-angle sides, the two right-angle sides are respectively attached to two outer side surfaces of the corresponding corner of the light guide panel and partially buffer positioned by the positioning column, and the positioning column for buffer positioning is sheathed with an elastic rubber ring.

Preferably, the inner side surface of the right-angle side of the buffer part is tooth-shaped.

Preferably, the buffer part is provided with a groove on the back of the side right-angle surface butting with the light guide panel in the direction away from the light guide panel, and the direction of the groove is in parallel with the side of the light guide panel.

Preferably, the buffer part and the positioning part are separately formed; the positioning part is provided with a positioning column, the buffer part is provided with a positioning hole in the position corresponding to the positioning column, and the positioning column is sheathed in the positioning hole to fix the buffer part.

The invention has the advantages that a new positioning structure for light guide panels is used by the edge-lit backlight module and the LCD device of the invention, the positioning structure is used for rigidly positioning the light guide panel in the direction facing the light source and for buffer positioning the light guide panel in other directions, and the light coupling distance between the light guide panel and the light source of the edge-lit backlight module is controlled because the light guide panel is rigidly positioned in the direction facing the light source, so as to obtain preferable light guiding effect; the light guide panel is buffer positioned in other directions in order to absorb the heat expansion or cold contraction quantity of the light guide panel, and avoid the warpage and deformation of the light guide panel; and the fracture of the light guide panel caused by the rigid contact between the light guide panel and the positioning structure when the light guide panel is impacted is avoided.

Figure 1:
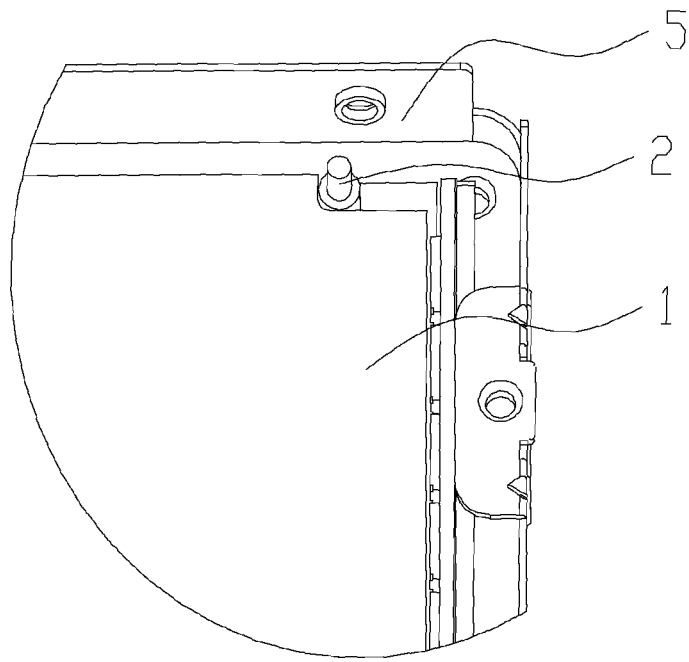
FIG. 1 is a schematic diagram of a positioning column for rigid positioning of an edge-lit backlight module of the invention.

Wherein: 1. light guide panel; 2. positioning column; 3. elastic rubber ring; 4. buffer part; 41. right-angle side; 42. tooth-shaped buffer surface; 43. groove; 44. light guide panel bearing surface; 5. backplane.

DETAILED DESCRIPTION

The invention discloses an edge-lit backlight module and an LCD device. The LCD device comprises the edge-lit backlight module. As an example, the edge-lit backlight module of the invention is shown in FIG. 1 to FIG. 4. The edge-lit backlight module comprises a light guide panel 1 and a positioning part for positioning the light guide panel 1. The light guide panel 1 is rigidly positioned in the direction facing a light source, and buffer positioned in all the other directions.

A new positioning structure is used by the edge-lit backlight module and the LCD device of the invention. The positioning structure is used for rigidly positioning the light guide panel 1 in the direction facing the light source and for buffer positioning the light guide panel 1 in other directions, and the light coupling distance between the light guide panel and the light source of the edge-lit backlight module is controlled because the light guide panel 1 is rigidly positioned in the direction facing the light source, to obtain preferable light guiding effect; the light guide panel is buffer positioned in other directions to absorb the heat expansion or cold contraction quantity of the light guide panel, thereby avoiding the warpage and deformation of the light guide panel 1; and the fracture of the light guide panel caused by the rigid contact between the light guide panel 1 and the positioning structure when the light guide panel is impacted is avoided.

The smaller the clearance between the light incident surface of the light guide panel 1 and the light source, the better the light coupling effect. The light coupling effect is the best when the clearance is zero. The light incident surface of the light guide panel 1 of the invention is assembled with the light source with zero clearance, and the heat expansion quantity of the light guide panel 1 is fully absorbed in other directions.

In the example, the positioning part is a backplane 5. The light guide panel 1 is positioned on the backplane 5; the rigidly positioned corner of the light guide panel 1 is provided with a nick, and the backplane 5 is provided with a positioning column in the position corresponding to the nick; the corner is rigidly positioned by the positioning column in both the X and Y direction, and the rest corners are buffer positioned in both the X and Y direction. Within the plane of the light guide panel, the direction perpendicular to the light incident surface of the light guide panel is the X direction, and the direction parallel to the light incident surface is the Y direction. The technical scheme of using the positioning column 2 and setting the nick in the light guide panel 1 is used because the space near the light source is limited, and small space is occupied in the technical scheme, so that the volume of the backlight module can be reduced as far as possible. In the example, one corner of the light guide panel 1 is accurately and rigidly positioned by the positioning column 2, so that the corner is accurately positioned in the X direction, specifically, the corner can be positioned with zero assembly clearance to control the light coupling distance between the light guide panel 1 and the light source of the edge-lit backlight module, so as to obtain preferable light guiding effect; the rest corners of the light guide panel 1 are positioned by the buffer positioning structure in both the X and Y direction to absorb the heat expansion or cold contraction quantity of the light guide panel 1, thereby avoiding the warpage and deformation of the light guide panel; and the fracture of the light guide panel 1 caused by the rigid contact between the light guide panel 1 and the positioning structure when the light guide panel 1 is impacted is avoided. In the example, because one corner is accurately and rigidly positioned by the positioning structure of light guide panel, and three corners are buffer positioned, the light guide panel 1 is easily installed.

Figure 2:
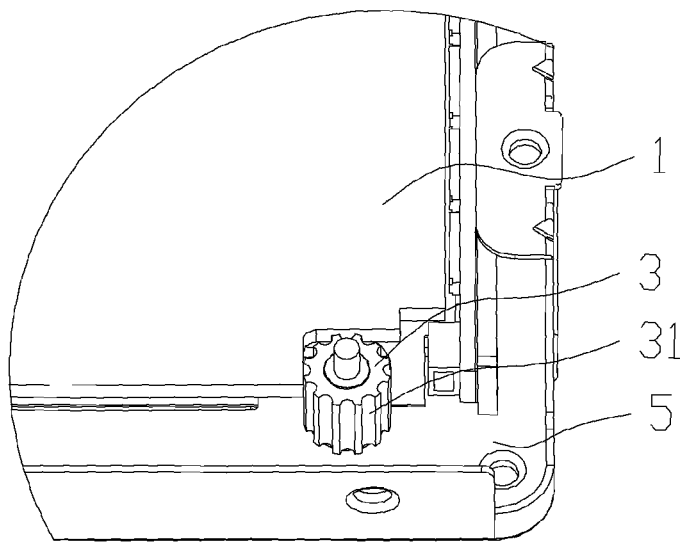
FIG. 2 is a schematic diagram of a positioning column for buffer positioning of an edge-lit backlight module of the invention.

In the example, the light guide panel is partially buffer positioned by a buffer part 4 in the rest directions. The buffer part 4 comprises two right-angle sides 41, the two right-angle sides 41 are respectively attached to two corresponding outer side surfaces of the light guide panel 1 and partially buffer positioned by the positioning column. As shown in FIG. 2, the positioning column for buffer positioning is sheathed with an elastic rubber ring 3. The side surface of the elastic rubber ring 3 is tooth-shaped, and the elastic rubber ring 3 can be made of rubber or silicone rubber, and can be made of other elastic materials as well. The elastic rubber ring 3 can provide certain buffer space by self elasticity; the elastic rubber ring 3 with a tooth-shaped outer side surface has bigger buffer space, and can fully absorb the heat expansion or cold contraction quantity of the light guide panel 1; the specific tooth shape of the outer side surface of the elastic rubber ring 3 can be freely selected, the shape can be either semicircular arc or rectangular, and is not limited to the example.

Figure 3:
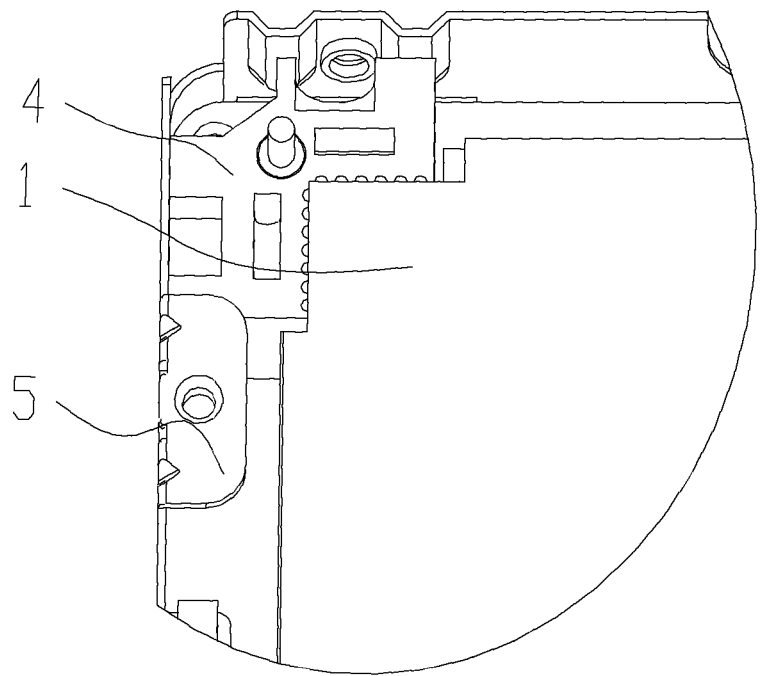
FIG. 3 is a structure diagram of two right-angle sides of a buffer part for buffer positioning of an edge-lit backlight module of the invention.
Figure 4:
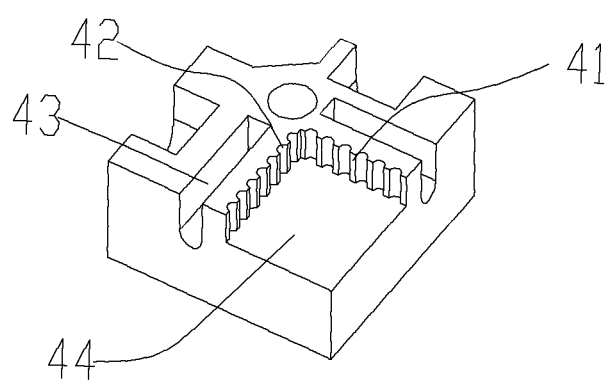
FIG. 4 is a structure diagram of a buffer part of the invention.

As shown in FIG. 3 and FIG. 4, two corners of the light guide panel 1 away from the light source are buffer positioned by the buffer part 4. The phenomenon that the optical quality is reduced because the nick is arranged in the light guide panel 1 is prevented as the surface contact position is used without processing the light guide panel 1. The buffer part 4 and the backplane 5 are separately formed. The backplane 5 is provided with a positioning column, the buffer part 4 is provided with a positioning hole in the position corresponding to the positioning column, and the positioning column 4 is sheathed in the positioning hole to fix the buffer part 4. The inner side surface of each right-angle side 41 of the buffer part 4 is tooth-shaped to form a tooth-shaped buffer surface 42. The tooth-shaped buffer surface 42 of the two right-angle sides 41 of the buffer part 4 can reduce the contact area between the two right-angle sides 41 and the light guide panel 1 under the condition that the positioning length is not reduced, thereby obtaining buffer effect. The specific tooth shape of the tooth-shaped buffer surface 42 can be freely selected, the shape can be either semicircular arc or rectangular, and is not limited to the example.

In the example, the buffer part 4 is provided with a groove 43 on the back of the side right-angle surface butting with the light guide panel 1 in the direction away from the light guide panel 1, and the direction of the groove 43 is in parallel with the side of the light guide panel 1; in addition, in the example, the buffer part 4 is further provided with a light guide panel bearing surface 44, and the light guide panel bearing surface 44 is mutually perpendicular to the two right-angle sides 41 of the buffer part 4. The groove 43 makes the two right-angle sides 41 soft and provides greater buffer allowance, and performs further deformation to increase buffer effect when the tooth-shaped buffer surface 42 cannot sufficiently buffer and adjust as the heat expansion quantity or the tolerance of the light guide panel 1 is larger. The light guide panel bearing surface 44 can prevent the light guide panel 1 from sinking when protecting the light guide panel 1.

In the example, the light guide panel 1 has the advantages of simple structure and convenient assembly because the rigidly positioned corner of the light guide panel 1 is rigidly positioned by the positioning column 2 in both the X and Y direction. Optionally, the corner can be rigidly positioned only in the X direction, and be buffer positioned in the Y direction, such as the corner is positioned by the right-angle sides of the buffer part. The traditional rigid positioning is used by the right-angle sides in the X direction, and the buffer side positioning is used by the right-angle sides in the Y direction, and the aforementioned beneficial effect can be obtained as well.

In the invention, the light guide panel can also be positioned by the two right-angle sides 41 of the buffer part 4 in other directions, or can be buffer positioned by the positioning column sheathed with an elastic rubber ring 3 in all the other directions, and the aforementioned beneficial effect can be obtained as well.

In the invention, the buffer part and the positioning part can be integratedly formed; and the positioning part can also be a back frame.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

I claim:

1. An edge-lit backlight module, comprising: a light guide panel and a positioning part for positioning the light guide panel, said light guide panel being rigidly positioned in the direction facing a light source and buffer positioned in all the other directions, wherein one corner of said light guide panel near the light source is rigidly positioned in an X direction and rigidly positioned or buffer positioned in a Y direction, the rest corners are buffer positioned in both the X and Y direction; within a plane of the light guide panel, a direction perpendicular to the light incident surface of the light guide panel is the X direction, and a direction parallel to the light incident surface is the Y direction.

2. The edge-lit backlight module of claim 1, wherein a rigidly positioned corner of said light guide panel is provided with a nick, said positioning part is provided with a positioning column in the position corresponding to the nick, and the corner is rigidly positioned by said positioning column in both the X and Y direction.

3. The edge-lit backlight module of claim 1, wherein the light guide panel is buffer positioned by a buffer part in all the other directions; said buffer part comprises two right-angle sides, and the two right-angle sides are respectively attached to two outer side surfaces of the corresponding corner of the light guide panel.

4. The edge-lit backlight module of claim 3, wherein the inner side surface of the right-angle sides of said buffer part is tooth-shaped.

5. The edge-lit backlight module of claim 4, wherein said buffer part is provided with a groove on the back of the side right-angle surface butting with the light guide panel in the direction away from the light guide panel, and the direction of said groove is in parallel with the side of the light guide panel.

6. The edge-lit backlight module of claim 3, wherein said buffer part and said positioning part are separately formed; said positioning part is provided with a positioning column, said buffer part is provided with a positioning hole in the position corresponding to the positioning column, and said positioning column is sheathed in the positioning hole to fix the buffer part.

7. The edge-lit backlight module of claim 3, wherein the buffer part is further provided with a light guide panel bearing surface, and the light guide panel bearing surface is mutually perpendicular to the two right-angle sides of the buffer part.

8. The edge-lit backlight module of claim 1, wherein the light guide panel is buffer positioned by a positioning column in all said other directions, and said positioning column for buffer positioning is sheathed with an elastic rubber ring.

9. The edge-lit backlight module of claim 8, wherein the side surface of said elastic rubber ring is tooth-shaped.

10. The edge-lit backlight module of claim 1, the light guide panel is partially buffer positioned by a buffer part in said other directions; said buffer part comprises two right-angle sides, the two right-angle sides are respectively attached to two outer side surfaces of the corresponding corner of the light guide panel and partially buffer positioned by the positioning column, and said positioning column for buffer positioning is sheathed with an elastic rubber ring.

11. The edge-lit backlight module of claim 10, wherein the inner side surface of the right-angle sides of said buffer part is tooth-shaped.

12. The edge-lit backlight module of claim 11, wherein said buffer part is provided with a groove on the back of the side right-angle surface butting with the light guide panel in the direction away from the light guide panel, and the direction of said groove is in parallel with the side of the light guide panel.

13. The edge-lit backlight module of claim 10, wherein said buffer part and said positioning part are separately formed; said positioning part is provided with a positioning column, said buffer part is provided with a positioning hole in the position corresponding to the positioning column, and said positioning column is sheathed in the positioning hole to fix the buffer part.

14. The edge-lit backlight module of claim 1, wherein the light incident surface of said light guide panel is assembled with the light source with zero clearance.

15. An LCD device, comprising: an edge-lit backlight module; said edge-lit backlight module comprising a light guide panel and a positioning part for positioning the light guide panel; said light guide panel being rigidly positioned in the direction facing a light source and buffer positioned in all the other directions, wherein one corner of said light guide panel near the light source is rigidly positioned in an X direction and rigidly positioned or buffer positioned in a Y direction, the rest corners are buffer positioned in both the X and Y direction; within a plane of the light guide panel, a direction perpendicular to the light incident surface of the light guide panel is the X direction, and a direction parallel to the light incident surface is the Y direction.

16. The LCD device of claim 15, wherein a rigidly positioned corner of said light guide panel is provided with a nick, said positioning part is provided with a positioning column in the position corresponding to the nick, and the corner is rigidly positioned by said positioning column in both the X and Y direction.

17. The LCD device of claim 15, wherein the light guide panel is buffer positioned by a buffer part in all said other directions; said buffer part comprises two right-angle sides, and the two right-angle sides are respectively attached to two outer side surfaces of the corresponding corner of the light guide panel.

18. The LCD device of claim 17, wherein the inner side surface of the right-angle sides of said buffer part is tooth-shaped.

19. The LCD device of claim 18, wherein said buffer part is provided with a groove on the back of the side right-angle surface butting with the light guide panel in the direction away from the light guide panel, and the direction of said groove is in parallel with the side of the light guide panel.

20. The LCD device of claim 17, wherein said buffer part and said positioning part are separately formed, said positioning part is provided with a positioning column, said buffer part is provided with a positioning hole in the position corresponding to the positioning column, and said positioning column is sheathed in the positioning hole to fix the buffer part.

21. The LCD device of claim 15, wherein said light guide panel is partially buffer positioned by a buffer part in said other directions; said buffer part comprises two right-angle sides, the two right-angle sides are respectively attached to two outer side surfaces of the corresponding corner of the light guide panel and partially buffer positioned by the positioning column, and said positioning column for buffer positioning is sheathed with an elastic rubber ring.

22. The LCD device of claim 21, wherein the buffer part is further provided with a light guide panel bearing surface, and the light guide panel bearing surface is mutually perpendicular to the two right-angle sides of the buffer part.

* * * * *